United States Patent Office 2,790,444
Patented Apr. 30, 1957

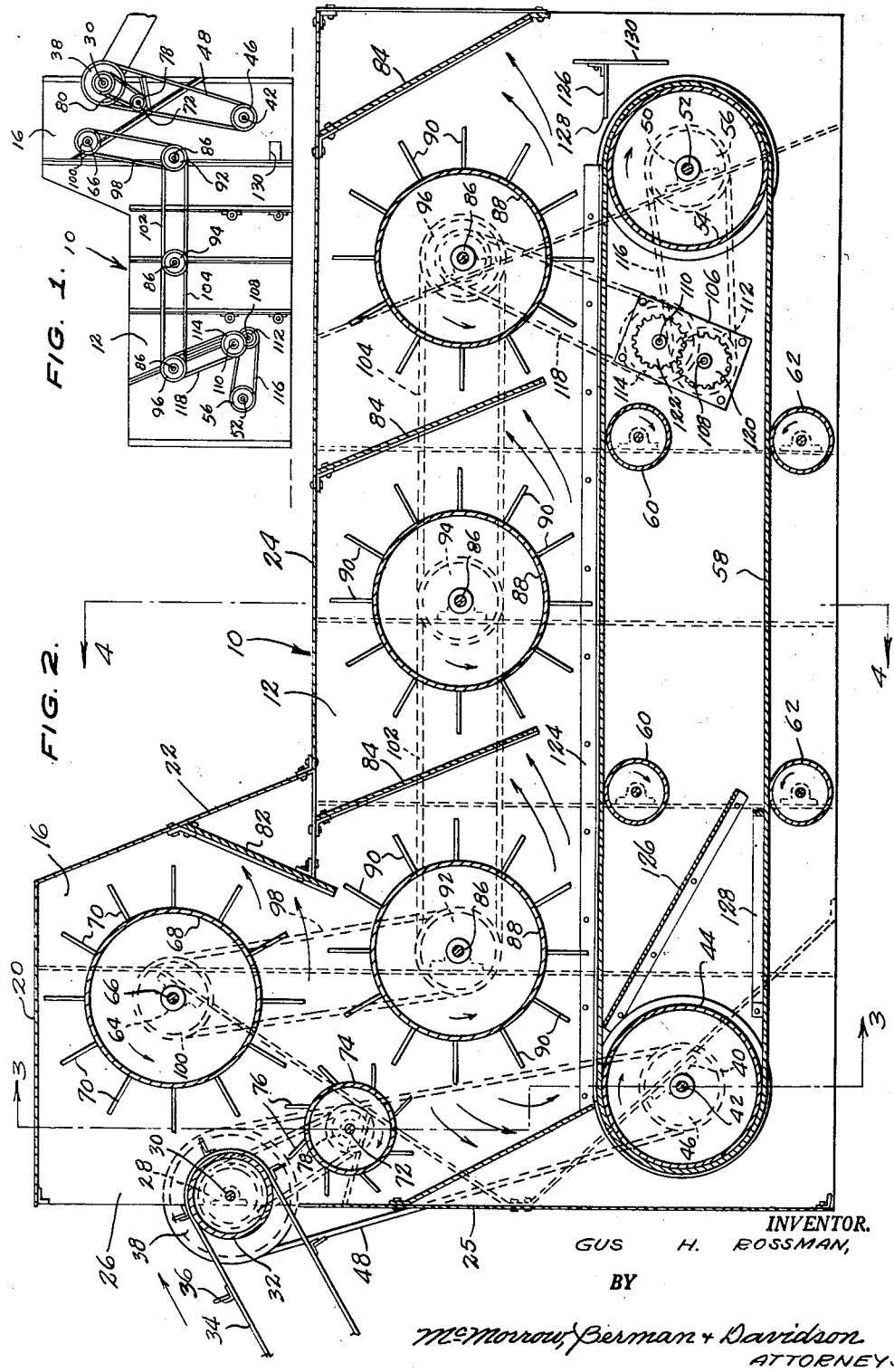

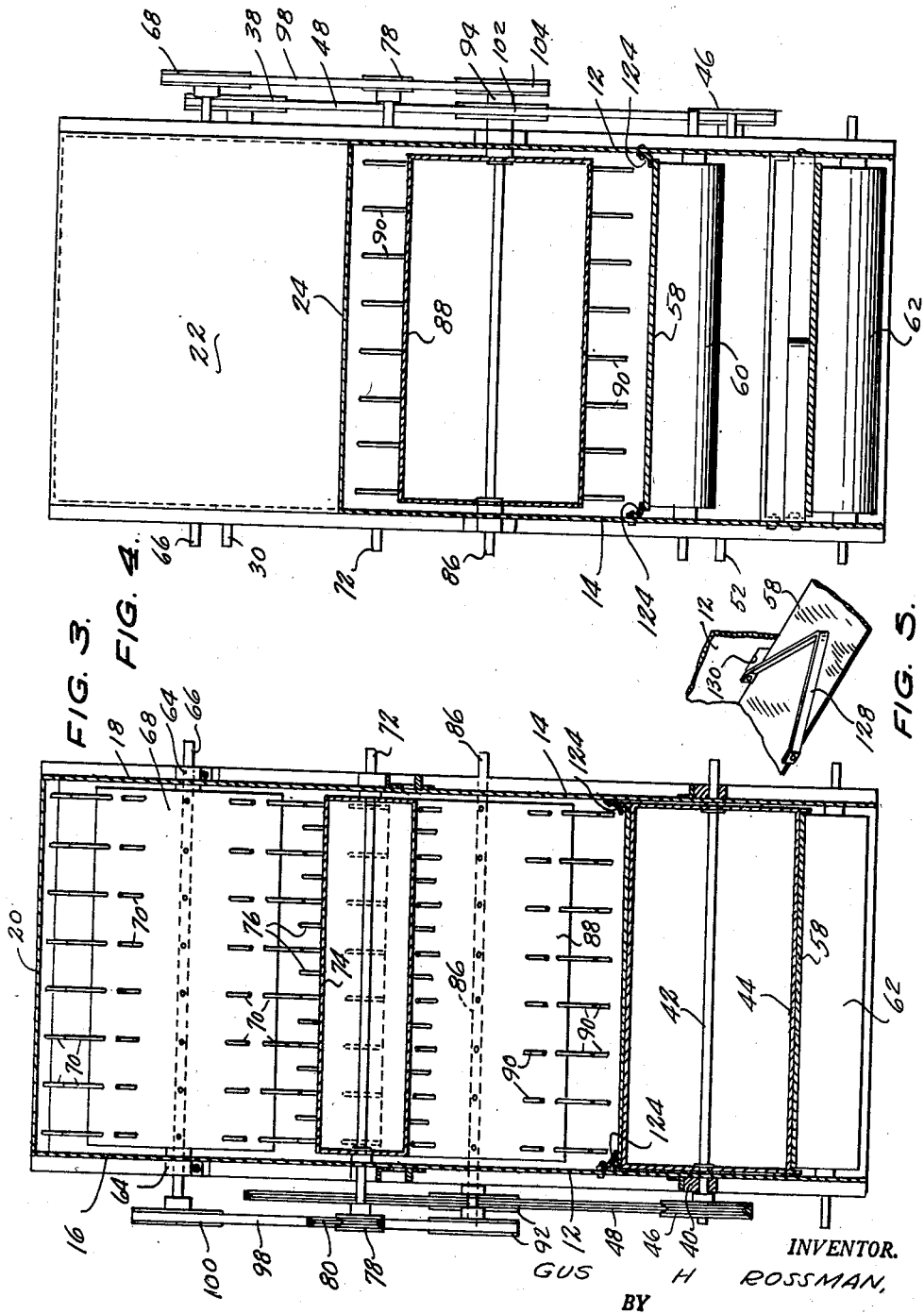

2,790,444

PEA VINER AND SHELLER

Gus H. Rossman, Cut Bank, Mont.

Application August 13, 1954, Serial No. 449,705

1 Claim. (Cl. 130—30)

This invention relates to a threshing machine and more particularly to a threshing machine for vegetable products of the type in which the fruit is contained within pods such as beans and peas.

The primary object of the invention is to separate the pods from the vines and to rupture the pods to facilitate the separation of the fruit therefrom.

Another object is to deliver the separated parts and fruit to a conveyor for transfer to further processing equipment.

A further object is to prevent the separated fruit from falling into the conveyor operating and supporting mechanism and to avoid the crushing or mutilation of the fruit.

The above and other objects may be attained by employing this invention which embodies among its features a battering board, vine advancing means mounted below said battering board for advancing pod carrying vines therebeneath, picker fingers mounted above the vine advancing means for movement in arcuate paths in advance of the battering board, and said fingers engaging said vines and stripping the pods therefrom and forceably propelling the pods against the battering board to rupture said pods and render accessible fruit contained therein.

Other features include a battery of longitudinally spaced downwardly inclined battering boards, vine advancing means mounted below the battering boards for advancing pod carrying vines in a rectilinear path therebeneath, a cylinder mounted in advance of each battering board to rotate above the vine advancing means about an axis which lies parallel to the battering boards, and picker fingers carried by the cylinders for rotation therewith in arcuate paths which intersect the rectilinear path of movement of the vines for engaging the vines and stripping the pods therefrom and forceably propelling the stripped pods against the battering boards to rupture said pods and render accessible fruit contained therein.

In the drawings:

Figure 1 is a side view on a reduced scale of a threshing machine embodying the features of this invention;

Figure 2 is an enlarged longitudinal sectional view of the threshing machine illustrated in Figure 1;

Figure 3 is a transverse sectional view taken substantially on the line 3—3 of Figure 2;

Figure 4 is a transverse sectional view taken substantially on the line 4—4 of Figure 2; and Figure 5 is a perspective view of the V-shaped deflector.

Referring to the drawings in detail, this improved threshing machine designated generally 10 comprises spaced parallel side walls 12 and 14 which are provided adjacent one end of the machine with upwardly projecting extensions 16 and 18 carrying at their upper ends a transversely extending cover plate 20 having a downwardly and outwardly inclined extension 22 which joins at its lower edge a top 24 carried by the upper edges of the side walls 12 and 14. An end wall 25 is carried by the side walls 12 and 14 adjacent the extensions 16 and 18 and terminates at the upper end of the side walls 12 and 14 to define a mouth 26 through which the vines to be threshed are introduced into the interior of the thresher 10. Mounted for rotation in suitable bearings 28 carried by the extensions 16 and 18 above the upper edges of the side walls 12 and 14 is a horizontally extending shaft 30, and carried by said shaft and extending transversely across the machine 10 adjacent the lower end of the mouth 26 is a drive roller 32 over which is trained a feeder belt 34 carrying flights 36 which are adapted to engage a mat of vines and deliver them through the mouth 26 into the machine 10. Carried by the shaft 30 outside of and adjacent the extension 16 is a driven pulley 38 through which driving connection with the driving mechanism of the threshing machine to the roller 32 is imparted.

Mounted in suitable bearings 40 carried by the side walls 12 and 14 and extending between the side walls adjacent the end of the machine carrying the extensions 16 and 18 is a shaft 42 upon which is mounted for rotation between said side walls is a driving drum 44, and carried by the shaft 42 on the outside of the machine adjacent the side wall 16 is a drive pulley 46 which is keyed to the shaft 42 so as to be rotated therewith. An endless belt 48 is trained over the pulleys 38 and 46 to establish driving connection between the drum 44 and the endless conveyor belt 34.

Mounted in suitable bearings 50 carried by the side walls 12 and 14 adjacent the end of the machine remote from the drum 44 is a shaft 52 which extends through the side walls and lies parallel to the shaft 42 and carried by the shaft 52 for rotation therewith is a drum 54 which, like the drum 44, extends transversely between the side walls 12 and 14. A drive pulley 56 is carried by the shaft 52 adjacent the outer side of the side wall 12 and has driving connection with said drive shaft 52 to cause the drum 54 to rotate about the axis of the shaft 52. An endless conveyor belt 58 is trained over the drums 44 and 54 so that when the drum 54 is rotated, the drum 44 will move in unison therewith. Supporting rollers 60 are carried by the side walls 12 and 14 and extend transversely therebetween beneath the upper run of the conveyor belt 58 and similar supporting rollers 62 are carried by the side walls 12 and 14 and extend therebetween below the lower run of the belt 58 to guide said belt in its closed path about the drums 44 and 54.

Mounted in suitable bearings 64 carried by the extensions 16 and 18 and extending therethrough is a shaft 66 carrying a feed drum 68 which extends between the extensions 16 and 18 and carries an annular row of circumferentially spaced radially extending fingers 70 which move counterclockwise in an arcuate path when viewed as in Figure 2 adjacent the endless belt 34 to engage vines delivered by said belt 34 through the mouth 26 and draw them into the machine. Mounted on a shaft 72 which is carried by the side walls 12 and 14 which lies below the drum 32 is a cylinder 74 which extends between the side walls carrying outwardly extending circumferentially spaced fingers 76 which are adapted to cooperate with the fingers 70 in guiding the vines into the machine. A drive pulley 78 is carried by the shaft 72 adjacent the outer side of the wall 12 and encircling the pulley 38 and the drive pulley 78 is an endless belt 80 which establishes driving connection between the shaft 30 and the shaft 72. The roller 32 and cylinder 74 rotate in a clockwise direction when viewed in Figure 2 so that the flights 36, fingers 70 and fingers 76 will cooperate in feeding the vines into the machine. A baffle 82 is carried by the inclined wall of the feeder defined between the extensions 16 and 18 of the top wall 20 and this inclined baffle 82 extends downwardly with its lower edge disposed between the side walls 12 and 14 to prevent the vines from being moved by the fingers into a dead space within the machine.

Carried by the top 24 and extending downwardly and rearwardly therefrom between the side walls 12 and 14 are battering boards 84, the lower edges of which are disposed in spaced relation to the upper run of the belt 58 to provide passages through which vines deposited on the belt 58 may move in a rectilinear path toward the discharge end of the machine.

Mounted in longitudinally spaced bearings carried by the side walls 12 and 14 are horizontally disposed transversely extending shafts 86 upon which are mounted for rotation between the side walls 12 and 14 and in advance of their respective battering boards 84 are drums 88 carrying outwardly extending radially disposed circumferentially spaced picker fingers 90 which move in circular paths adjacent and in advance of the battering boards 84 and in closely spaced relation to the top surface of the upper run of the endless belt 58. Drive pulleys 92, 94 and 96 are connected to the shafts 86 adjacent the outer sides of the side wall 12, and the pulleys 92 and 94 are equipped with longitudinally spaced belt receiving grooves, and engaging in one of the grooves in the pulley 92 is an endless belt 98 which extends around a drive pulley 100 carried by the shaft 66, to establish driving connection between the pulley 92 and the drum 68. An endless drive belt 102 is trained over the pulley 92 and engages the adjacent groove therein to establish driving connection between the pulley 92 and the pulley 94, it being understood that the belt 102 extends into one of the grooves in the pulley 94. Encircling the pulley 94 and the pulley 96 for establishing driving connection therebetween is an endless belt 104. It will thus be seen that when the pulley 96 is driven, the drums 88 and 68 will move in unison in a counterclockwise direction, as illustrated in Figure 2, to cause the picker fingers 90 carried by the drums 88 to engage vines moving in the rectilinear path below the battering boards 84 and strip pods from said vines to forcibly propel the pods against the battering boards 84 so as to rupture them and expose the fruit contained therein for removal therefrom.

Secured to the inner side of the side plate 12 of the machine 10 to a bed plate 106 in which are mounted for rotation about spaced axes stub shafts 108 and 110 which project through the adjacent side 12 and carry adjacent their outer ends drive pulleys 112 and 14. An endless drive belt 116 encircles the pulleys 56 and 112 to establish driving connection between the stub shaft 108 and the shaft 52, and a similar endless belt 118 encircles one portion of the double pulley 96 and the pulley 114 so as to establish driving connection between the shaft 110 and the drums 88. A spur gear 120 is carried by the shaft 108 for rotation therewith and has meshing engagement with a spur gear 122 which is carried by the shaft 110 for rotation therewith. It will thus be seen that when rotary motion is imparted to the shaft 108, the shaft 110 will rotate in the opposite direction.

In the preferred form of the invention the shaft 108 is coupled in any conventional manner (not shown) to a suitable prime mover (not shown) which will rotate the rollers 44 and 54 in a clockwise direction when viewed in Figure 2 to cause the upper run of the belt 58 to move to the right, as illustrated in Figure 2, while the drums 68 and 88 rotate in a counterclockwise direction when viewed in Figure 2.

Secured to the sides 12 and 14 in any suitable manner and extending downwardly and inwardly are guards 124 which overlie adjacent side edges of the upper run of the conveyor belt 58 to prevent the fruit which falls from the ruptured pods from entering any space between the side edges of the belt 58 and the sides 12 and 14 of the machine. A deflector 126 is carried by the side walls 12 and 14 and extends therebetween adjacent the drum 44. This deflector inclines downwardly as it recedes from the drum 44 and terminates at its lower end in spaced relation to the bottom run of the belt 58 so that any fruit which may find its way onto the deflector will be deposited on the lower run of the belt well in advance of the drum 44. A substantially V-shaped deflector 128 is carried by the side walls 12 and 14 below the deflector 126 and has its apex disposed away from the drum 44 so as to define a sweep which will deflect toward opposite sides of the machine fruit which may find its way onto the lower run of the belt 58. Discharge openings 130 extend through the side walls 12 and 14 adjacent opposite ends of the V-shaped deflector 128 through which pass fruit swept from the lower run of the belt 58 by said V-shaped deflector 128.

In use, matted vines are deposited on the conveyor belt 34 and with the device connected to the prime mover as previously described and the prime mover in operation, it will be evident that as the belt 58 moves about its drums 44 and 54, driving effort will be imparted to the feed roller 32 through the drive belt 48 to cause the vines deposited on the conveyor belt 34 to be moved upwardly into the mouth 26 of the machine where the vines are gripped by the fingers 70 of the feed drum 68 to withdraw them from the belt 34 and direct them downwardly toward the drum 88 adjacent the feed end of the device. As the vines are directed downwardly by the feed drum 68, they are engaged by the fingers 76 of the guiding cylinder 74 to direct them downwardly in contact with the picker fingers 90 onto the conveyor belt 58 to be moved in a rectilinear path toward the discharge end of the machine beneath the picker drums 88 and battering boards 84. Obviously, as the picker fingers 90 engage the vines, they will contact any pods carried by the vines and strip said pods from the vines. As the pods are stripped from the vines, they are forcibly propelled by the picker fingers 90 against the battering boards 84 to cause them to open and render accessible the fruit contained therein. The opened pods and the fruit discharged from the interior thereof are deposited on the upper run of the belt 58 and carried toward the discharge end of the machine to pass beneath a separator plate 126 which extends horizontally across the machine substantially in line with the path of movement of the upper run of the belt and is spaced from the belt 58 a distance sufficient to provide the discharge orifice 128 defined between the belt and the adjacent edge of the separator plate 126. A baffle 130 is carried by the separator plate 126 and extends above and below the separator plate 126 adjacent the end thereof remote from the conveyor belt 58 to deflect downwardly the fruit carried between the conveyor belt 58 and the separator plate 126. The portion of the baffle plate 130 which extends above the separator plate 126 defines a stop to retard the movement of the vines to the discharge end of the device until such time as the pods carried by the vines have been stripped therefrom.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A threshing machine which includes a battery of longitudinally spaced downwardly inclined battering boards, vine advancing means mounted below said battering boards for advancing pod carrying vines in a rectilinear path therebeneath, a cylinder mounted in advance of each battering board to rotate above the vine advancing means about an axis which lies parallel to the battering boards, and picker fingers carried by the cylinders for rotation therewith in arcuate paths which intersect the path of movement of the vines, said picker fingers engaging the vines and stripping the pods therefrom and forceably propelling the stripped pods against the battery boards to rupture said pods and render accessible fruit contained therein.

References Cited in the file of this patent

UNITED STATES PATENTS

| | | |
|---|---|---|
| 493,887 | Gamble | Mar. 21, 1893 |
| 1,765,830 | Fuse | June 24, 1930 |
| 2,084,935 | Bott | June 22, 1937 |